(12) United States Patent
Gao et al.

(10) Patent No.: US 10,747,617 B2
(45) Date of Patent: Aug. 18, 2020

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Hongpo Gao, Beijing (CN); Jian Gao, Beijing (CN); Geng Han, Beijing (CN); Yousheng Liu, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/199,440

(22) Filed: Nov. 26, 2018

(65) Prior Publication Data

US 2019/0332478 A1    Oct. 31, 2019

(30) Foreign Application Priority Data

Apr. 28, 2018  (CN) .......................... 2018 1 0399988

(51) Int. Cl.
*G06F 11/10* (2006.01)
*G06F 9/50* (2006.01)
*G06F 3/06* (2006.01)

(52) U.S. Cl.
CPC .......... *G06F 11/1092* (2013.01); *G06F 3/061* (2013.01); *G06F 3/0631* (2013.01); *G06F 3/0632* (2013.01); *G06F 3/0689* (2013.01); *G06F 9/5038* (2013.01); *G06F 2209/5011* (2013.01)

(58) Field of Classification Search
CPC .... G06F 3/0689; G06F 11/1092; G06F 3/061; G06F 13/1668; G06F 11/2094; G06F 3/0631; G06F 3/0632; G06F 9/5038; G06F 2209/5011
See application file for complete search history.

(56) References Cited

U.S. PATENT DOCUMENTS

| | | | |
|---|---|---|---|
| 10,013,323 B1 | 7/2018 | Puhov et al. | |
| 10,013,325 B1 | 7/2018 | Garrett, Jr. et al. | |
| 10,152,254 B1 | 12/2018 | Kang et al. | |
| 10,346,247 B1 | 7/2019 | Gao et al. | |
| 10,353,773 B2 * | 7/2019 | Hasegawa | G06F 3/0689 |

(Continued)

*Primary Examiner* — Idriss N Alrobaye
*Assistant Examiner* — Richard B Franklin
(74) *Attorney, Agent, or Firm* — BainwoodHuang (57) ABSTRACT

Techniques manage a storage system and involve: determining priorities of a first set of to-be-executed operations of a first stripe of a plurality of stripes of the storage system and priorities of a second set of to-be-executed operations of a second stripe, the plurality of stripes at least including the first stripe and the second stripe different from the first stripe, and each of the plurality of stripes including a plurality of extents distributed on different storage devices; determining a first to-be-executed operation with the highest priority among the priorities of the first set of to-be-executed operations; determining a second to-be-executed operation with the highest priority among the priorities of the second set of to-be-executed operations; and determining operation execution priorities of the first and second stripes based on the priorities of the first and second to-be-executed operations. Accordingly, the processing performance of the storage system is increased.

18 Claims, 6 Drawing Sheets

(56) References Cited

U.S. PATENT DOCUMENTS 10,459,814 B2  10/2019  Gao et al.
2019/0146891 A1* 5/2019  Ben Dayan ......... G06F 11/3485
                                              714/4.11

* cited by examiner

METHOD, APPARATUS AND COMPUTER PROGRAM PRODUCT FOR MANAGING STORAGE SYSTEM

FIELD

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure relate to storage management, and more specifically to a method, an apparatus and a computer program product for managing a storage system.

BACKGROUND

With the development of data storage technologies, various data storage devices are capable of providing users with increasingly high data storage capability, and the data access speed has also been improved greatly. At the same time of improving the data storage capability, users propose increasingly high demands for performances of the storage system such as response time. Various data storage systems based on Redundant Arrays of Independent Disks have already been developed to improve the performance of the storage system.

For example, currently, mapped Redundant Arrays of Independent Disks (mapped RAID) have already been developed. In the mapped RAID, a disk is a logic concept and may include a plurality of extents. The plurality of extents included in one logic disk may be distributed on different physical storage devices in a resource pool. For a plurality of extents in a stripe of the mapped RAID, the plurality of extents should be distributed on different physical storage devices, so that when a physical storage device fails in which one of the plurality of extents is located on the failed physical storage device, a rebuilding operation may be executed to restore data from the physical storage devices in which other extents are located. However, in an existing solution, if the mapped RAID is being rebuilt, any type of disk copying operations in the same RAID is rejected, even though they are not directed to the same mapping stripe. This weakens the processing capability of the mapped RAID and lowers the performance of the storage system.

SUMMARY

Accordingly, there are provided a method, an apparatus and a computer program product for managing a storage system.

According to a first aspect of the present disclosure, there is provided a method of managing a storage system. The method includes: determining priorities of a first set of to-be-executed operations of a first stripe of a plurality of stripes of a storage system and priorities of a second set of to-be-executed operations of a second stripe, the plurality of stripes at least including the first stripe and the second stripe different from the first stripe, and each of the plurality of stripes including a plurality of extents distributed on different storage devices; determining a first to-be-executed operation with the highest priority among the priorities of the first set of to-be-executed operations; determining a second to-be-executed operation with the highest priority among the priorities of the second set of to-be-executed operations; and determining operation execution priorities of the first and second stripes based on the priorities of the first and second to-be-executed operations.

According to a second aspect of the present disclosure, there is provided an apparatus for managing a storage system, including: at least one processing unit; and at least one memory coupled to the at least one processing unit and having machine-executable instructions stored therein, which, when executed by the at least one processing unit, cause the apparatus to perform acts including: determining priorities of a first set of to-be-executed operations of a first stripe of a plurality of stripes of a storage system and priorities of a second set of to-be-executed operations of a second stripe, the plurality of stripes at least including the first stripe and the second stripe different from the first stripe, and each of the plurality of stripes including a plurality of extents distributed on different storage devices; determining a first to-be-executed operation with a highest priority among the priorities of the first set of to-be-executed operations; determining a second to-be-executed operation with a highest priority among the priorities of the second set of to-be-executed operations; and determining operation execution priorities of the first and second stripes based on the priorities of the first and second to-be-executed operations.

According to a third aspect of the present disclosure, there is provided a computer program product being tangibly stored on a non-transient computer readable medium and including machine-executable instructions for performing the method according to the first aspect of the present disclosure.

BRIEF DESCRIPTION OF THE DRAWINGS

Through the following detailed description with reference to the accompanying drawings, the features, advantages and other aspects of the embodiments disclosed herein will become more apparent. Various implementations of the present disclosure are illustrated by way of example and in a non-limiting manner. In the drawings.

DETAILED DESCRIPTION OF EMBODIMENTS

Various embodiments of the present disclosure will be described as follows in greater detail with reference to the drawings. Although certain embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

In the context of the present disclosure, a storage system may be a RAID-based storage system. The RAID-based storage system may combine a plurality of storage devices together into a disk array. By providing redundant storage devices, reliability of the whole disk group substantially exceeds a single storage device. The RAID may provide various advantages over the single storage device, e.g., enhanced data integration, improved fault tolerance, increased throughput or capability, and the like. RAID has many standards, e.g., RAID-1, RAID-2, RAID-3, RAID-4, RAID-5, RAID-6, RAID-10, and RAID-50. For more details of RAID levels, those skilled in the art may refer to, for example https://en.wikipedia.org/wiki/Standard RAID levels, and https://en.wikipedia.org/wiki/Nested RAID levels.

Figure 1:
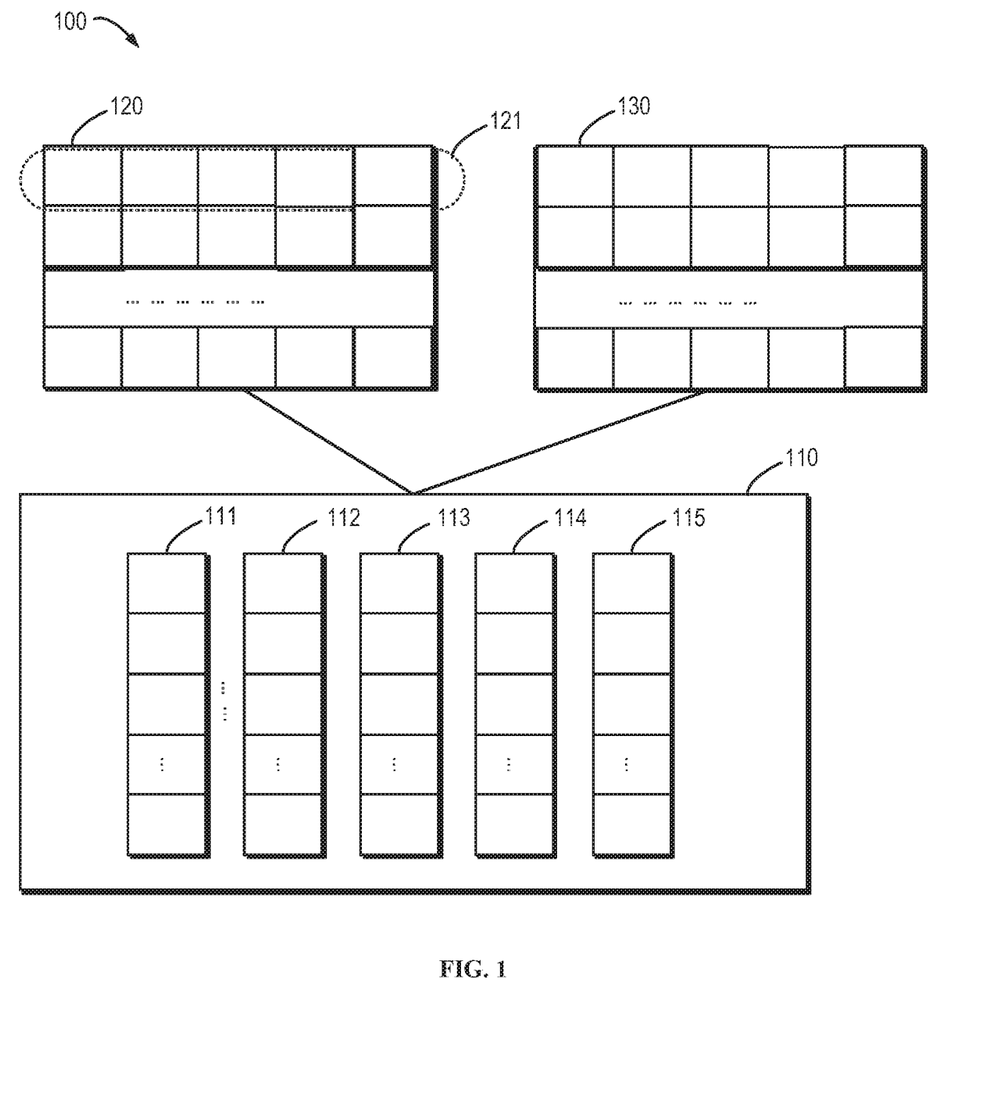
FIG. 1 illustrates a schematic diagram of a storage system in which a method according to the present disclosure may be implemented.

FIG. 1 illustrates a schematic diagram of a storage system 100 in which a method according to the present disclosure may be implemented. In FIG. 1, principles of the storage system 100 are illustrated using a RAID-5 array as an example which includes five independent storage devices 111-115 (4D+1P, wherein 4D means that the storage system includes four storage devices 111-114 to store data, and 1P means that the storage system includes one storage device 115 to store parity information). It should be appreciated that although FIG. 1 illustrates five storage devices 111-115, more or fewer storage devices may be included according to different RAID levels in other implementations.

In the embodiment shown in FIG. 1, the storage devices 111-115 may be considered as forming a resource pool 110. In the embodiment of the present disclosure, the storage devices for example may be devices for storage such as disks and drives. It should be appreciated that the usage of storage devices, disks and storage in the following descriptions of embodiments is interchangeable. By monitoring disk events, it is possible to manage disk operating conditions and the disk mapping of each mapped RAID.

In the embodiment shown in FIG. 1, the storage system 100 is illustrated, by way of example, with a mapped RAID 120 obtained based on the resource pool. The mapped RAID 120 includes a plurality of stripes, and each stripe (e.g., the stripe 121) is distributed across the plurality of physical storage devices (e.g., across the storage devices 111-115). The stripes may be simply interpreted as storage areas with a certain address range in the plurality of storage devices. Data stored in the stripe 121 includes data blocks on the respective storage devices 111-115.

It should be appreciated that in the following discussions, the storage system may be described using the mapped RAID as an example and in a non-limiting manner. The storage system according to embodiments of the present disclosure may be implemented in other suitable forms.

The way of storing data in other stripes are similar to that of the stripe 121. The difference is that the check data regarding other data blocks may be stored on the storage devices different from the storage device 115. In this way, when one storage device in the plurality of storage devices 111-115 fails, the data in the failed device may be recovered from other normal storage devices. In addition, it should be appreciated that it is also possible to form another mapped RAID 130 or other suitable mapped RAIDS based on the resource pool.

In the embodiment of the present disclosure, a disk extent (DE), also called an extent, is a minimal disk resource unit in the mapped RAID. The capacity of the disk will be organized as a group of continuous non-overlapping disk areas. The range of the disk includes a major portion of space that includes user data space and a minor portion of space serving as internal metadata space.

The disk extent pool, also called the resource pool, includes a group of storage devices, e.g., a group of disks. This group of disks may be expanded or reduced, and they manage states of all disk extents, for example, the usage, allocation and recycling of the extents.

A mapped RAID group is created over the resource pool, and it uses some RAID algorithms to protect data integrity. Disks in one mapped RAID group must be located in the same performance level.

A RAID extent (RE), also called a stripe, includes N extents, wherein N is the width of a RAID group according to a RAID configuration policy.

A RAID extent mapping table records which extents are included in one stripe as well as the position of the stripe.

In a conventional solution, data at one position, if lost, may be rebuilt with content at other positions. In the mapped RAID, one extent may be rebuilt with other extents in the same mapping stripe.

There may be many operations besides the rebuilding operation. If one drive receives an EOL (End of Life) event, the mapped RAID may move the data to a good disk range before the drive is dead. This may be called Proactive Copying (PACO) data movement.

If the disk extents are not distributed evenly in the extent pool, the disk extent allocation across all the disks should be re-balanced for a better performance. This type of disk extent data movement is called shuffle. For example, expansion of the mapped RAID would cause such drive extent movement.

Disk replacement is performed after the failure of one drive. A new drive will be updated into the extent pool. Apparently, the disk replacement will cause an uneven distribution of the disk extents. In this case, replacement-balancing is enabled to balance the distribution.

In the resource pool, IO across multiple disks in the extent pool is balanced. It is possible to balance the I/O by moving data from one disk extent to another disk extent.

The resource pool may detect a disk state change event, and trigger a disk extent copying operation when the event is detected. In a conventional solution, when the disk extent data copying event happens during the data rebuilding performed by the mapped RAID, any type of disk copying operations in the same RAID will be rejected if the mapped RAID is performing the rebuilding, regardless of whether these operations belong to the same stripe. Therefore, only one operation of the copying and rebuilding operations can be performed with respect to the same RAID. This substantially lowers the system performance.

Specifically, in the conventional solution, the background operation priority is managed by the mapped RAID. One mapped RAID has one exclusive priority. If any drive fails, it is not allowed to generate any disk extent copying operation as the data rebuilding is performed by the mapped RAID with the highest priority. If there is a disk set with EOL, it is not allowed to generate other types of extent copying operations even they don't belong to the same mapped stripe. In fact, a single operation of rebuilding or data copying only generates very low I/O load for the SSD drive.

According to the conventional solution, rebuilding, proactive copying and shuffle can only be executed one after another, and thus cannot be executed quickly. As a result, the disk performance can't be fully exploited. The mapped RAID will stay in an unhealthy state for a long time, which increases the risk of system data loss.

In fact, the rebuilding and copying operations are within different stripes that are composed of different extents. Hence, it is desired to execute the rebuilding and copying operations in parallel within two different stripes, in order to improve the system performance (e.g., reduce overall completion time).

In the embodiment of the present disclosure, priorities of background operations through the whole mapped RAID are assigned to each stripe. Therefore, the background operations can be distributed to each stripe so that the operations may be executed per stripe according to the priority of each stripe. This way enables operations for different stripes in the same storage system to be executed in parallel, improves the background operating performance, and prevents the system from being in an inefficient or unbalanced state for a long time.

Figure 2:
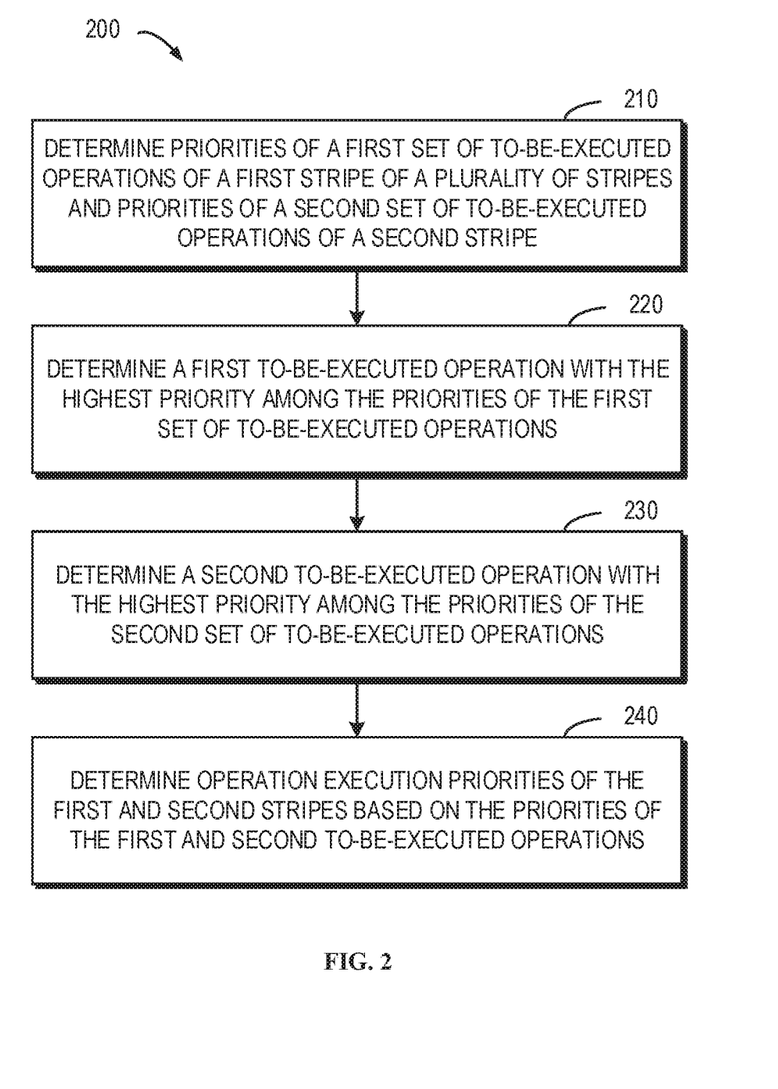
FIG. 2 illustrates a flowchart of a method of managing a storage system according to an embodiment of the present disclosure.

FIG. 2 illustrates a flowchart of a method 200 for managing a storage system according to an embodiment of the present disclosure. At 210, priorities of a first set of to-be-executed operations of a first stripe of a plurality of stripes of the storage system and priorities of a second set of to-be-executed operations of a second stripe are determined. The plurality of stripes at least includes the first stripe and the second stripe different from the first stripe. Each of the plurality of stripes includes a plurality of extents distributed on different storage devices. The to-be-executed operations may be background operations of the storage system, e.g., rebuilding, copying and the like.

In some embodiments, a priority setting rule may be determined based on importance of the operations of stripes. Then, based on the priority setting rule, priorities of to-be-executed operations in the first set of to-be-executed operations and priorities of to-be-executed operations in the second set of to-be-executed operations may be determined.

The importance of operations may be set in various ways. After a predetermined period or after completing the execution of a specific operation, the importance of operations may also be updated or changed. In some embodiments, for operations such as rebuilding, proactive copying, shuffling (also called shuffle copying) and balance copying, the rebuilding operation may be of the greatest importance, namely, of the highest priority. The proactive copying operation may be of relatively high importance, and meanwhile may be of lower priority than the rebuilding operation. The shuffling and balancing operation may be of relatively low importance, namely, of even lower priority.

It should be appreciated that the above operations are by way of example and non-limiting. There may be other suitable operations for the stripe.

At 220, a first to-be-executed operation with the highest priority among the priorities of the first set of to-be-executed operations is determined. For example, when the first set of to-be-executed operations includes three types of operations, namely, rebuilding, proactive copying and shuffling, the first to-be-executed operation is the rebuilding operation because it has the highest priority.

At 230, a second to-be-executed operation with the highest priority among the priorities of the second set of to-be-executed operations is determined. For example, when the second set of to-be-executed operations includes two types of operations, namely, shuffling and balancing operations, the second to-be-executed operation is the shuffling operation because it is of higher priority.

At 240, operation execution priorities of the first and second stripes are determined based on the priorities of the first and second to-be-executed operations. In some embodiments, when the priority of the first to-be-executed operation is higher than the priority of the second to-be-executed operation, it is determined that the first to-be-executed operation of the first stripe is executed with a higher priority than the second to-be-executed operation of the second stripe.

Further referring to the above example, the first to-be-executed operation is the rebuilding operation, and the second to-be-executed operation is the shuffling operation, thus it is determined that the operation execution priority of the first stripe is higher than that of the second stripe. In the case that there is only one thread for the operation of the stripe, it may be determined that the first to-be-executed operation of the first stripe is executed before the second to-be-executed operation of the second stripe is executed.

Figure 4:
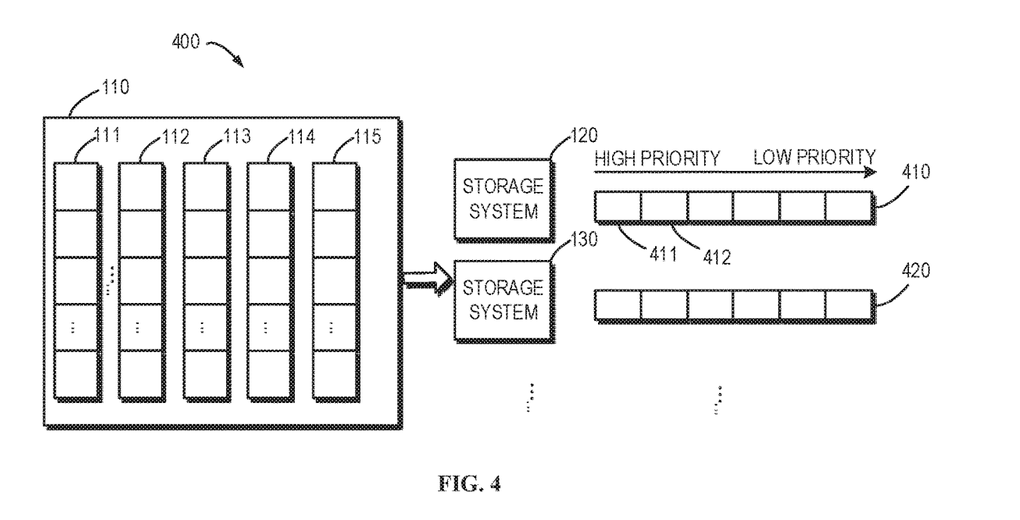
FIG. 4 illustrates a schematic diagram of priority ranking of operations according to an embodiment of the present disclosure.

FIG. 4 illustrates a schematic diagram 400 of priority ranking of operations according to an embodiment of the present disclosure. In FIG. 4, for the storage system 120, a priority queue 410 may be obtained according to the determination that the operation execution priority of the first stripe is higher than that of the second stripe. The first element 411 in the queue corresponds to the to-be-executed operation of the first stripe, and the second element 412 corresponds to the second to-be-executed operation of the second stripe. This indicates that the first to-be-executed operation has a higher priority than the second to-be-executed operation. Similarly, a priority queue 420 may also be determined for the storage system 130, and the details will not be repeated here.

In the example shown in FIG. 4, when it is found that the priorities of the operations of stripes is changed, the priority queue 410 may be updated according to the changed priority. For example, corresponding stripes are re-sorted in the queue according to the priority order.

Each stripe maintains the priorities of background operations. In this method, it is allowed to set the number of parallel threads for each mapped RAID to run the background operations. For example, if two threads are used to run the operations of stripes, all the stripes will be scanned from beginning to end upon the activation of background operations by the mapped RAID. Two stripes with the highest priority may be selected, and the two threads are used to perform the to-be-executed operations with the highest priority of these two stripes, respectively.

Alternatively, in some embodiments, if it is determined that the execution priority of the first stripe is higher than that of the second stripe, the first to-be-executed operation of the first stripe and the second to-be-executed operation of the second stripe may be executed in a first thread and a second thread different from the first thread, respectively. In this case, the first to-be-executed operation may be executed

```
typedef struct fbe_mapped_raid_extent_info_entry_s
{
    fbe_mapped_raid_copy_info_t         copy_info;
    fbe_raid_position_bitmask_t         rebuild_logging_bitmask;
    fbe_mapped_raid_checkpoint_info_t   checkpoint_info[FBE_MAPPED_RAID_MAX_REBUILD_POSITIONS];
    fbe_u8_t                            verify_bits;
}fbe_mapped_raid_extent_info_entry_t;
``` in the first thread, and the second to-be-executed operation may be executed in the second thread, thereby achieving parallel processing of the operations of the plurality of stripes. In this way, the processing ability of the system may be improved and the system performance may be enhanced.

In some embodiments, if the first to-be-executed operation has been executed, the first to-be-executed operation may be removed from the first set of to-be-executed operations to update the first set of to-be-executed operations. Then an operation with the highest priority among the updated first set of to-be-executed operations is determined as a new first to-be-executed operation.

In some embodiments, if a request to execute a new operation for the first stripe is received, a priority of the new operation is compared with the priority of the first to-be-executed operation. In the case that the priority of the new operation is higher than the priority of the first to-be-executed operation, the new operation may be executed. Otherwise, the new operation may be rejected.

The resource pool has a background thread to scan the disks periodically. When the resource pool receives a drive state change event, the background thread will be scheduled immediately. If it's a drive failure event, the resource pool will set a timestamp on this disk. When a period (e.g., 5 minutes) elapses, the mapped RAID will start the rebuilding operation. The resource pool will allocate a new disk extent for the failure position and then send the event to the mapped RAID to mark the rebuilding priority and request the mapped RAID to start the rebuilding.

The resource pool processes other types of events in a similar way. For each operation, the priority may be checked first with the related mapped stripes. Next the processing of generating the proactive copying operation is described.

When the resource pool detects one drive issue, it will scan all the disk extents in this drive. For the disk extent that has been allocated, the resource pool will inquire authorization of the related mapped stripe. A request priority is determined according to the priority of the current stripe operation. If the request priority is lower, the request will be denied. If the request priority is higher, the stripe will update priorities in the memory and reply with authorization. The resource pool will continue to scan all extents.

Figure 3:
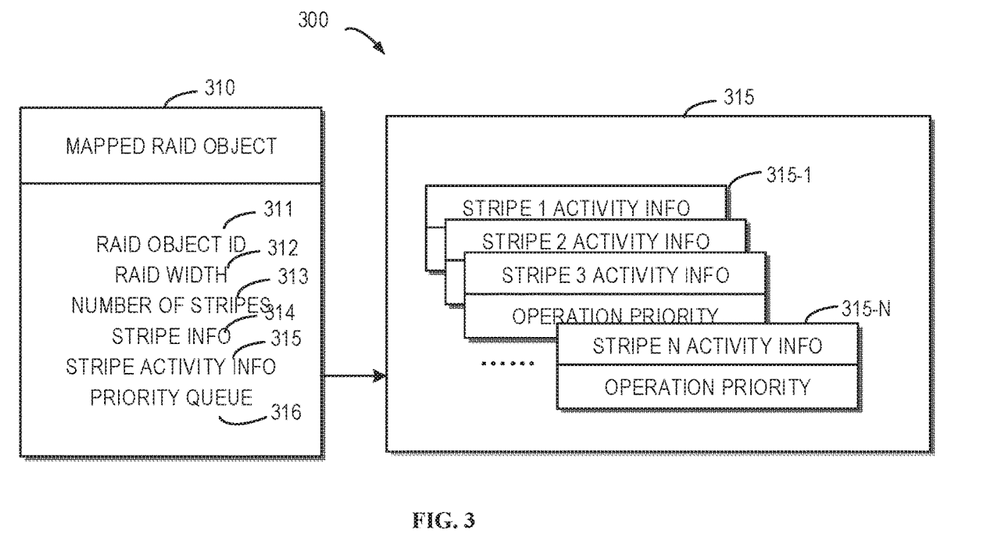
FIG. 3 illustrates a schematic diagram of activity information of stripes according to an embodiment of the present disclosure.

FIG. 3 illustrates a schematic diagram 300 of activity information of stripes according to an embodiment of the present disclosure. In some embodiments, the mapped RAID object may refer to an implementation structure of the storage system, and it may include a plurality of attributes. FIG. 3 shows a mapped RAID object 310, including: RAID object identifier (ID) 311, RAID width 312, number of stripes 313, stripe information 314, stripe activity information 315 and priority queue 316. It should be appreciated that these attributes of the mapped RAID object 310 are by way of example and non-limiting, and it may include many types of suitable attributes.

The stripe information 314 for example may be stored as metadata. In some embodiments, the stripe information 314 for example may be implemented in the following form:

wherein copy_info represents information about copying, Rebuild logging bitmask and checkpoint_info represent information about drive rebuilding, and Verify_bits represents information about stripe error verification. It should be appreciated that the above example is only for illustration purpose, and not intended to limit the scope of the present disclosure.

In some embodiments, each extent has such metadata. After completing the current operation, the metadata will be read to check if another background operation needs to be executed. If so, the priorities will be updated, and the positions of stripes in the priority queue, namely, the execution priorities of stripes, will be updated. Then, the background operations may be rescheduled, and the stripe with the highest execution priority is extracted from the priority queue, so that the operation with the highest priority in the stripe is executed.

The stripe activity information 315 includes priorities of to-be-executed operations of each stripe. Specifically, the stripe activity information 315 may include activity information 315-1 of stripe 1, . . . , activity information 315-N of stripe N, N being an integer greater than or equal to 1 and representing the number of stripes in the storage system (namely, the mapped RAID in this example). Herein the stripe activity information 315-1 to 315-N is collectively called the stripe activity information 315. The stripe activity information 315 may or may not be stored on the disk. When the stripe activity information 315 is not stored on the disk, the stripe activity information is initialized upon setting up, and disappears if the system shuts down or the storage system fails.

In some embodiments, the priority of the to-be-executed operation may be defined in the following form.

```
typedef enum fbe_medic_action_e {
    FBE_MEDIC_ACTION_IDLE = 0
    FBE_MEDIC_ACTION_BALANCE,
    FBE_MEDIC_ACTION_SHUFFLE,
    FBE_MEDIC_ACTION_SHUFFLE_BY_SWAP,
```

```
    FBE_MEDIC_ACTION_ERROR_VERIFY,
    FBE_MEDIC_ACTION_PACO,
    FBE_MEDIC_ACTION_REBUILD,
    FBE_MEDIC_ACTION_HIGHEST_PRIORITY,
    FBE_MEDIC_ACTION_LAST
}fbe_medic_action_t;
```

In the above example definitions of priorities, the rebuilding operation is of the highest priority; the proactive copying (PACO) operation is of higher priority than error verification; error verification is of higher priority than shuffle copying triggered by replacement. Next follows the priority of the shuffle copying operation, and the balance copying operation has the lowest priority.

Respective operations are discussed below in more detail.

Rebuilding: it may refer to that, in the case that data at one position is lost, data at other positions is used to rebuild the lost data. For example, one extent may be reconstructed using other extents within the same mapped stripe.

Proactive copying: when a drive (or disk) is set with the EOL attribute, the resource pool will trigger the proactive copying operation. EOL means that the drive will die. The drive will send the EOL event to the resource pool. The resource pool will allocate a new extent and update it to the mapped RAID extent mapping table. Then the resource pool notifies the mapped RAID of the type of the current copying operation. The mapped RAID will execute background operations according to the priorities of its background operations.

Shuffling (also called shuffle copying): when all the extents are not in the drive resource pool, the resource pool will trigger the shuffle copying operation. The shuffle copying operation will move data from disks with more allocated extents to disks with fewer consumed extents. The shuffle copying operation is triggered by the resource pool or drive replacement (upon replacing the failed disk).

For example, the shuffle copying operation may be triggered by determining whether the following condition is satisfied:

$$\frac{(free\_disk\_extent\_count - average\_free\_disk\_extent\_count)}{average\_free\_disk\_extent\_count} > K1 \quad (1)$$

wherein free_disk_extent count represents the number of free extents on each drive, and average free_disk_extent count represents the average number of free extents in the resource pool. For each disk in the resource pool, if equation (1) stands (herein K1 is a proportional value, e.g., 20%), the shuffle copying operation is triggered for the resource pool. The resource pool calculates the destination extent for the copying operation and updates the extent to the mapped stripe mapping table.

Shuffle copying triggered by replacement: when a new drive swaps in to replace a failed drive or a removed drive, the shuffling operation may be performed to move extents from reserved space to the new drive.

Balance copying (also called IO balance copying): the resource pool triggers the drive IO load based balance copying operation. When one drive has heavy IO load during a watch time window, it will move data from the extent with heavy IO load to others. The time window is configurable, e.g. to be 24 hours or 48 hours.

For example, the balance copying operation may be triggered by determining whether the condition of the following equation is satisfied:

$$\frac{|disk\_io\_count - average\_disk\_io\_count|}{average\_disk\_io\_count} >= K2 \quad (2)$$

wherein disk_io_count represents the number of IO during this time window, and average disk_io_count represents an average number of IO. If equation (2) stands (herein K2 is a proportional value, e.g., 50%), the balance copying operation is triggered. The balance copying operation is configurable. It can be enabled or stopped by users.

It should be appreciated that the priority order of the operations discussed above is only by way of example and non-limiting. The priority order may be changed or reset. For example, during the system operation or at any suitable time, the priority order may be changed according to system demands, operation urgency, types of events that trigger operations and so on.

In some embodiments, the priority order depends on severity of problems. The reason that the rebuilding operation has the highest priority is that if data is not rebuilt to new drive, the data may be lost if another drive also fails. Each stripe has one priority variable. This variable is only stored in the memory instead of in the disk. If system panic occurs during the execution of background operations, new priorities based on the current system status may be generated after reboot.

Figure 5:
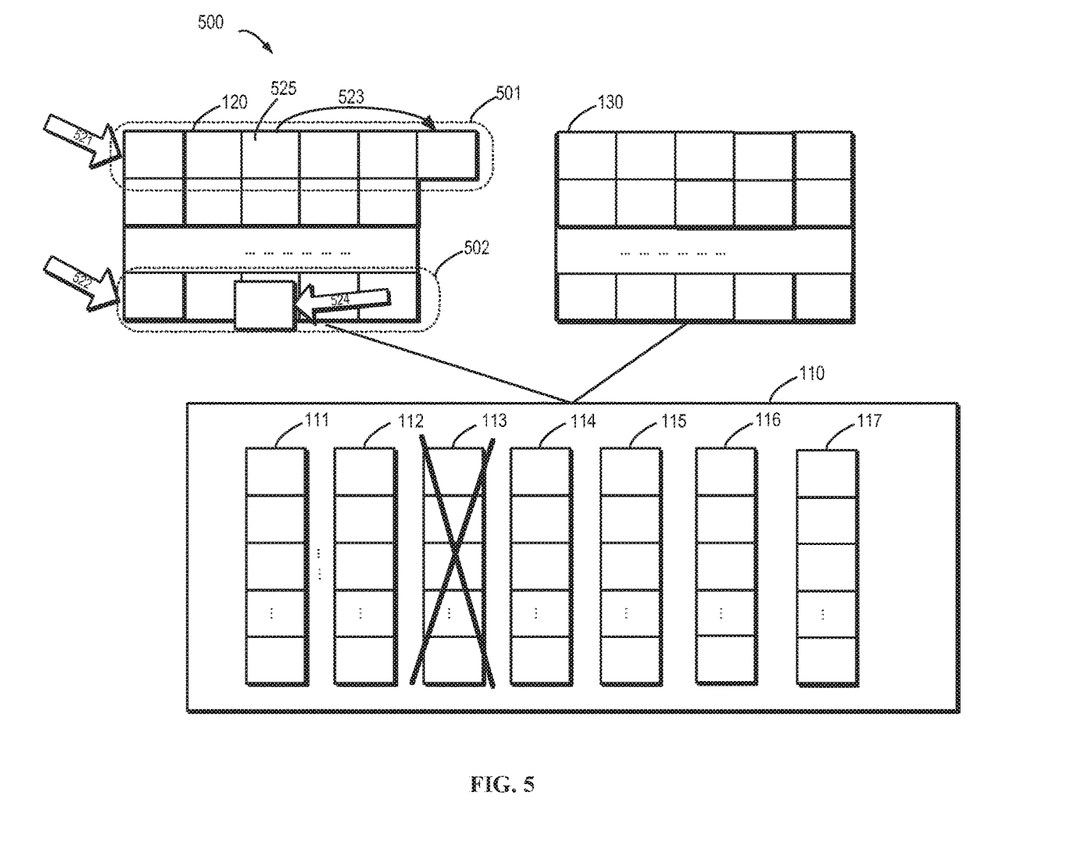
FIG. 5 illustrates a schematic diagram of performing parallel operations for different stripes of the same storage system according to an embodiment of the present disclosure.

In addition, as stated above, when the storage system allows a plurality of threads to execute operations of different stripes in parallel, the system performance can be improved more effectively. FIG. 5 illustrates a schematic diagram 500 of performing parallel operations for different stripes of the same storage system according to an embodiment of the present disclosure. As shown in FIG. 5, the resource pool 100 corresponds to two mapped RAIDs 120 and 130. In the case that the storage device 113 (for example, a drive or a disk) fails, a new storage device 117 may be used to replace the failed storage device 113. At this time, all stripes related to the storage device 113 are marked with the rebuilding operation of the highest priority. As shown in FIG. 5, the stripe 501 is a stripe related to the storage device 113 because the extent 525 therein comes from the storage device 113. Therefore, all lower-priority operations (e.g., balance copying) of stripes related to the storage device 113 are interrupted, and then the rebuilding 523 operation is executed in one thread 521. The lower-priority operation may be executed subsequently, for example, in next background schedule period. Meanwhile, if there are other stripes 502 that do not need to perform the highest-priority rebuilding operations, they might perform the shuffle copying 524 operation in another thread 522.

In this way, it is ensured that the higher-priority operation is executed in the same stripe. The lower-priority operations will be suspended, while the higher-priority operation will be executed. From the perspective of the overall storage system, stripes with higher operation execution priorities may be executed with higher priorities, i.e. operation execution priorities of different stripes are determined.

Figure 6:
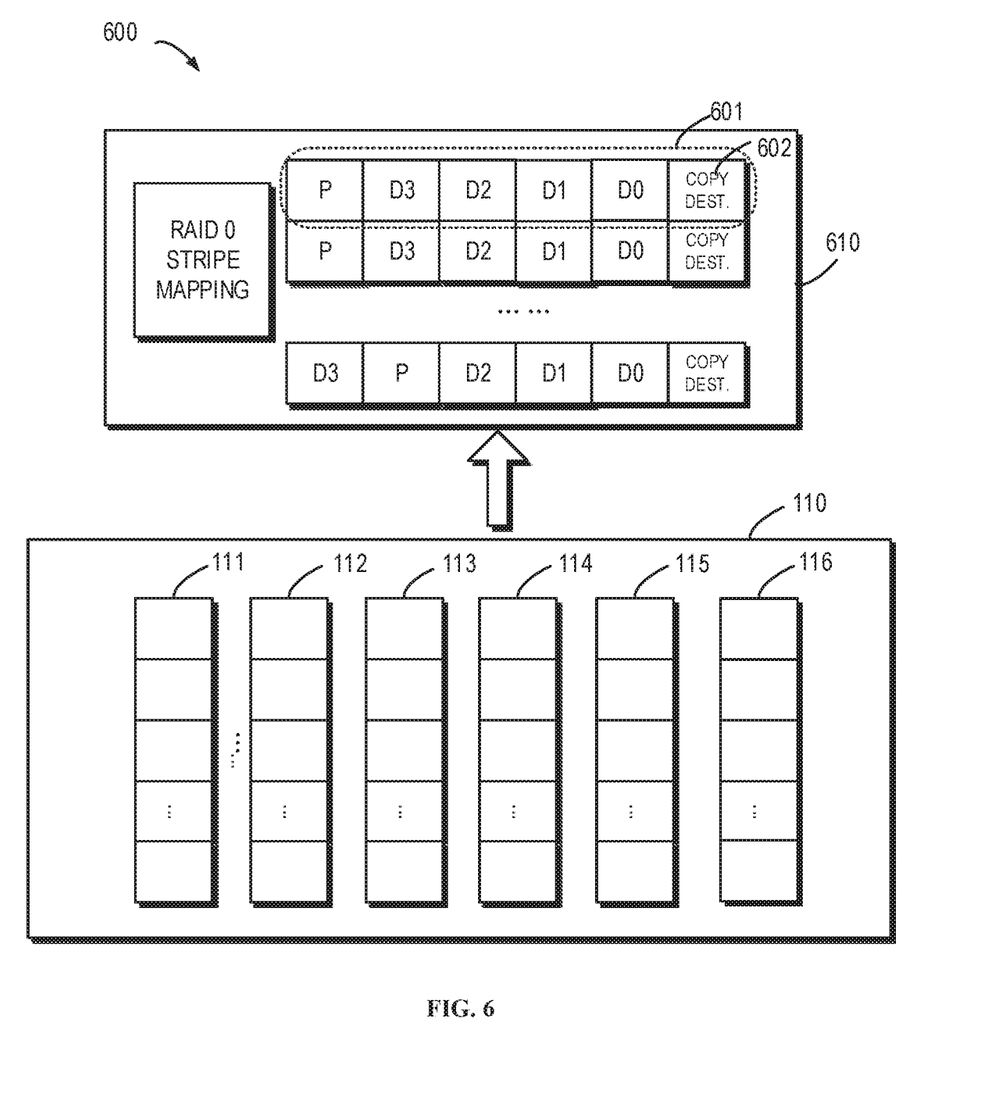
FIG. 6 illustrates a schematic diagram of a mapping table according to an embodiment of the present disclosure.

In some embodiments, the resource pool 110 is used to maintain mapping with respect to each storage system (e.g., mapped RAID). FIG. 6 illustrates a schematic diagram 600 of a mapping table 610 according to an embodiment of the present disclosure. Each row of the mapping table 610 corresponds to a stripe including a plurality of extents, for example, stripe 601. The last extent in the stripe is the copying destination. When moving extents of the mapped RAID, one extent will be allocated and updated to the copying destination field.

In some embodiments, the resource pool also manages the disk state and the disk usage status. It scans the disk state periodically and also checks the disk allocation status. If a drive fails, new disk extents may be used to replace disk extents at failed positions, and the mapped RAID is requested to mark it as "rebuilding needed". Then the mapped RAID will start data rebuilding. If there is a drive EOL event, allocated extents may be set as the copying destination 602, and the mapped RAID is caused to start data copying. The resource pool will also check if the disk extent allocation is even in the pool. If not, extent copying may be enabled to move data to the disk with fewer allocated extents, thereby improving usage uniformity for the extents in the resource pool.

When the current background operation is completed, the operation is for example the first to-be-executed operation mentioned in method 200. Another lower-priority background operation may be executed, and priorities are updated accordingly, thereby ensuring the priority queue of the background operations is updated so that subsequent operations can be executed according to the priority order.

Figure 7:
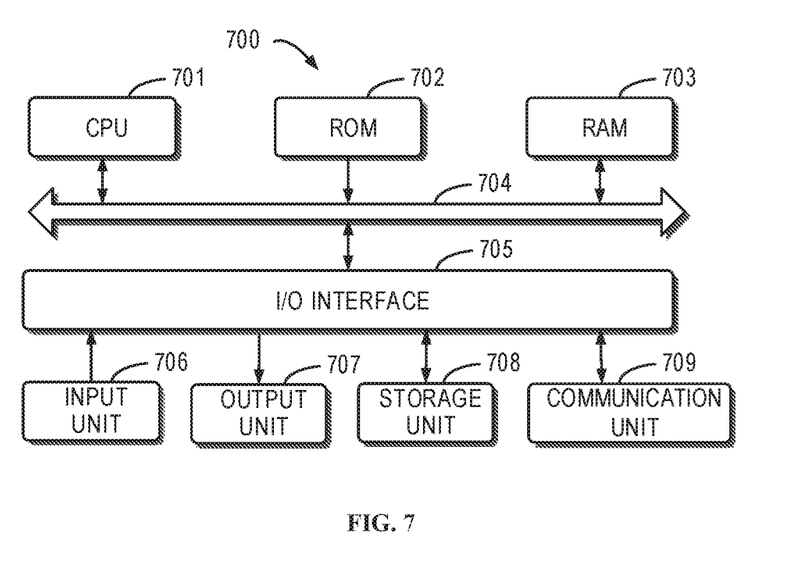
FIG. 7 illustrates a block diagram of an apparatus for managing a storage system according to an embodiment of the present disclosure.

FIG. 7 illustrates a block diagram of an apparatus 700 for managing a storage system according to an embodiment of the present disclosure. As shown in the figure, the apparatus 700 includes a central processing unit (CPU) 701 that may perform various appropriate actions and processing based on computer program instructions stored in a read-only memory (ROM) 702 or computer program instructions loaded from a memory unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

Various components in the device 700 are connected to the I/O interface 705, including: an input unit 706 such as a keyboard, a mouse and the like; an output unit 707 including various types of displays and a loudspeaker, etc.; a memory unit 708 including a disk, an optical disk, and etc.; a communication unit 709 including a network card, a modem, and a wireless communication transceiver, etc. The communication unit 709 allows the device 700 to exchange information/data with other devices through a computer network such as the Internet and/or various types of telecommunications networks.

Various processes and processing described above, e.g., the method 200, may be executed by the processing unit 701. For example, in some embodiments, the method 200 may be implemented as a computer software program that is tangibly embodied on a machine readable medium, e.g., the storage unit 708. In some embodiments, part or all of the computer program may be loaded and/or mounted onto the device 700 via ROM 702 and/or communication unit 709. When the computer program is loaded to the RAM 703 and executed by the CPU 701, one or more steps of the at least one of the method 200 as described above may be executed. Alternatively, in other implementations, the CPU 701 may also be configured to implement the above process/method in any other suitable manners.

According to some embodiments of the present disclosure, there is provided an apparatus for managing a storage system, including: at least one processing unit; and at least one memory coupled to the at least one processing unit and having machine-executable instructions stored therein, which, when executed by the at least one processing unit, cause the apparatus to perform acts including: determining priorities of a first set of to-be-executed operations of a first stripe of a plurality of stripes of a storage system and priorities of a second set of to-be-executed operations of a second stripe, the plurality of stripes at least including the first stripe and the second stripe different from the first stripe, and each of the plurality of stripes including a plurality of extents distributed on different storage devices; determining a first to-be-executed operation with the highest priority among the priorities of the first set of to-be-executed operations; determining a second to-be-executed operation with the highest priority among the priorities of the second set of to-be-executed operations; and determining operation execution priorities of the first and second stripes based on the priorities of the first and second to-be-executed operations.

In some embodiments, determining priorities of the first and second sets of to-be-executed operations of the first and second stripes of the storage system includes: determining a priority setting rule based on importance of operations of stripes; and determining, based on the priority setting rule, priorities of to-be-executed operations in the first set of to-be-executed operations and priorities of to-be-executed operations in the second set of to-be-executed operations.

In some embodiments, determining operation execution priorities of the first and second stripes includes: in response to the priority of the first to-be-executed operation being higher than the priority of the second to-be-executed operation, determining that the first to-be-executed operation of the first stripe is executed with a higher priority than the second to-be-executed operation of the second stripe.

In some embodiments, the acts further include: in response to the first to-be-executed operation having been executed, removing the first to-be-executed operation from the first set of to-be-executed operations to update the first set of to-be-executed operations; and determining an operation with the highest priority from the updated first set of to-be-executed operations, as a new first to-be-executed operation.

In some embodiments, the acts further include: in response to determining that the operation execution priority of the first stripe being higher than the operation execution priority of the second stripe, causing the first to-be-executed operation of the first stripe and the second to-be-executed operation of the second stripe to be executed in a first thread and a second thread different from the first thread, respectively.

In some embodiments, the acts further include: in response to receiving a request to execute a new operation for the first stripe, comparing a priority of the new operation with the priority of the first to-be-executed operation; in response to the priority of the new operation being higher than the priority of the first to-be-executed operation, executing the new operation; and in response to the priority of the new operation being lower than the priority of the first to-be-executed operation, rejecting the new operation.

In some embodiments, the first to-be-executed operation is at least one of a group consisting of: rebuilding, proactive copying, error verification, shuffle copying triggered by replacement, shuffle copying and balance copying.

Embodiments of the present disclosure relate to a method, an apparatus, a system and/or a computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (such as circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
 determining priorities of a first set of to-be-executed operations of a first stripe of a plurality of stripes of a storage system and priorities of a second set of to-be-executed operations of a second stripe, the plurality of stripes at least comprising the first stripe and the second stripe different from the first stripe, and each of the plurality of stripes comprising a plurality of extents distributed on different storage devices;
 determining a first to-be-executed operation with the highest priority among the priorities of the first set of to-be-executed operations;
 determining a second to-be-executed operation with the highest priority among the priorities of the second set of to-be-executed operations; and
 determining operation execution priorities of the first and second stripes based on the priorities of the first and second to-be-executed operations.

2. The method of claim 1, wherein determining priorities of the first and second sets of to-be-executed operations of the first and second stripes of the storage system comprises:
 determining a priority setting rule based on importance of operations of stripes; and
 determining, based on the priority setting rule, priorities of to-be-executed operations in the first set of to-be-executed operations and priorities of to-be-executed operations in the second set of to-be-executed operations.

3. The method of claim 1, wherein determining operation execution priorities of the first and second stripes comprises:
 in response to the priority of the first to-be-executed operation being higher than the priority of the second to-be-executed operation, determining that the first to-be-executed operation of the first stripe is executed with a higher priority than the second to-be-executed operation of the second stripe.

4. The method of claim 3, further comprising:
 in response to the first to-be-executed operation having been executed, removing the first to-be-executed operation from the first set of to-be-executed operations to update the first set of to-be-executed operations; and
 determining an operation with the highest priority among the updated first set of to-be-executed operations, as a new first to-be-executed operation.

5. The method of claim 1, further comprising:
 in response to determining that the operation execution priority of the first stripe being higher than the operation execution priority of the second stripe, causing the first to-be-executed operation of the first stripe and the second to-be-executed operation of the second stripe to be executed in a first thread and a second thread different from the first thread, respectively.

6. The method of claim 1, further comprising:
 in response to receiving a request to execute a new operation for the first stripe, comparing a priority of the new operation with the priority of the first to-be-executed operation;
 in response to the priority of the new operation being higher than the priority of the first to-be-executed operation, executing the new operation; and
 in response to the priority of the new operation being lower than the priority of the first to-be-executed operation, rejecting the new operation.

7. The method of claim 1, wherein the first to-be-executed operation is at least one of a group consisting of:
 rebuilding, proactive copying, error verification, shuffle copying triggered by replacement, shuffle copying and balance copying.

8. An apparatus for managing a storage system, comprising:
 at least one processing unit; and
 at least one memory coupled to the at least one processing unit and having machine-executable instructions stored therein, which, when executed by the at least one processing unit, cause the apparatus to perform acts comprising:
 determining priorities of a first set of to-be-executed operations of a first stripe of a plurality of stripes of a storage system and priorities of a second set of to-be-executed operations of a second stripe, the plurality of stripes at least comprising the first stripe and the second stripe different from the first stripe, and each of the plurality of stripes comprising a plurality of extents distributed on different storage devices;
 determining a first to-be-executed operation with the highest priority among the priorities of the first set of to-be-executed operations;
 determining a second to-be-executed operation with the highest priority among the priorities of the second set of to-be-executed operations; and
 determining operation execution priorities of the first and second stripes based on the priorities of the first and second to-be-executed operations.

9. The apparatus of claim 8, wherein determining priorities of the first and second sets of to-be-executed operations of the first and second stripes of the storage system comprises:
 determining a priority setting rule based on importance of operations of stripes; and
 determining, based on the priority setting rule, priorities of to-be-executed operations in the first set of to-be-executed operations and priorities of to-be-executed operations in the second set of to-be-executed operations.

10. The apparatus of claim 8, wherein determining operation execution priorities of the first and second stripes comprises:
 in response to the priority of the first to-be-executed operation being higher than the priority of the second to-be-executed operation, determining that the first to-be-executed operation of the first stripe is executed with a higher priority than the second to-be-executed operation of the second stripe.

11. The apparatus of claim 10, wherein the acts further comprise:
 in response to the first to-be-executed operation having been executed, removing the first to-be-executed operation from the first set of to-be-executed operations to update the first set of to-be-executed operations; and
 determining an operation with the highest priority from the updated first set of to-be-executed operations, as a new first to-be-executed operation.

12. The apparatus of claim 8, wherein the acts further comprise:
 in response to determining that the operation execution priority of the first stripe being higher than the operation execution priority of the second stripe, causing the first to-be-executed operation of the first stripe and the second to-be-executed operation of the second stripe to be executed in a first thread and a second thread different from the first thread, respectively.

13. The apparatus of claim 8, wherein the acts further comprise:
   in response to receiving a request to execute a new operation for the first stripe, comparing a priority of the new operation with the priority of the first to-be-executed operation;
   in response to the priority of the new operation being higher than the priority of the first to-be-executed operation, executing the new operation; and
   in response to the priority of the new operation being lower than the priority of the first to-be-executed operation, rejecting the new operation.

14. The apparatus of claim 8, wherein the first to-be-executed operation is at least one of a group consisting of:
   rebuilding, proactive copying, error verification, shuffle copying triggered by replacement, shuffle copying and balance copying.

15. A computer program product having a non-transitory computer readable medium which stores a set of instructions to manage a storage system; the set of instructions, when carried out by computerized circuitry of the storage system, causing the computerized circuitry to perform a method of:
   assigning first priorities to first to-be-executed operations to be executed on a first stripe of a plurality of stripes of the storage system and second priorities to second to-be-executed operations to be executed on a second stripe, the plurality of stripes including at least the first stripe and the second stripe, the second stripe being different from the first stripe, and each of the plurality of stripes including a plurality of extents distributed on different storage devices;
   based on the first priorities assigned to the first to-be-executed operations, identifying a first to-be-executed operation with the highest priority among the first to-be-executed operations;
   based on the second priorities assigned to the second to-be-executed operations, identifying a second to-be-executed operation with the highest priority among the second to-be-executed operations; and
   executing the first to-be-executed operation and the second to-be-executed operation in accordance with a first priority assigned to the first to-be-executed operation and a second priority assigned to the second to-be-executed operation.

16. A computer program product as in claim 15, wherein executing the first to-be-executed operation and the second to-be-executed operation includes:
   performing the first to-be-executed operation and the second to-be-executed operation in parallel to access first data from the first stripe and second data from the second stripe concurrently.

17. A computer program product as in claim 16, wherein the storage system includes a plurality of physical storage devices that provides mapped RAID (Redundant Array of Independent Disks) storage;
   wherein the number of mapped RAID threads that execute operations on the mapped RAID storage is set to at least two;
   wherein the first stripe includes a first set of extents of the physical storage devices;
   wherein the second stripe includes a second set of extents of the physical storage devices;
   wherein performing the first to-be-executed operation and the second to-be-executed operation in parallel includes:
      in a priority queue, queuing a first element that identifies the first to-be-executed operation in a first position in the priority queue and a second element that identifies the second to-be-executed operation in a second position in the priority queue based on the first priority assigned to the first to-be-executed operation and a second priority assigned to the second to-be-executed operation,
      in response to the first element being placed in the first position in the priority queue, executing the first to-be-executed operation in a first mapped RAID thread, and
      in response to the second element being placed in the second position in the priority queue, executing the second to-be-executed operation in a second mapped RAID thread that is different from the first mapped RAID thread; and
   wherein the first thread and the second thread operate in parallel to concurrently perform the first to-be-executed operation and the second to-be-executed operation.

18. A computer program product as in claim 17, wherein each of the first stripe and the second stripe stores data in accordance with RAID-5; and
   wherein the first to-be-executed operation writes data to a new extent of the first set of extents, and the second to-be-executed operation concurrently writes data to a new extent of the second set of extents to reduce overall completion time.

* * * * *